(No Model.)
P. A. BARR.
SUPPORT FOR BICYCLES.
No. 589,925. Patented Sept. 14, 1897.
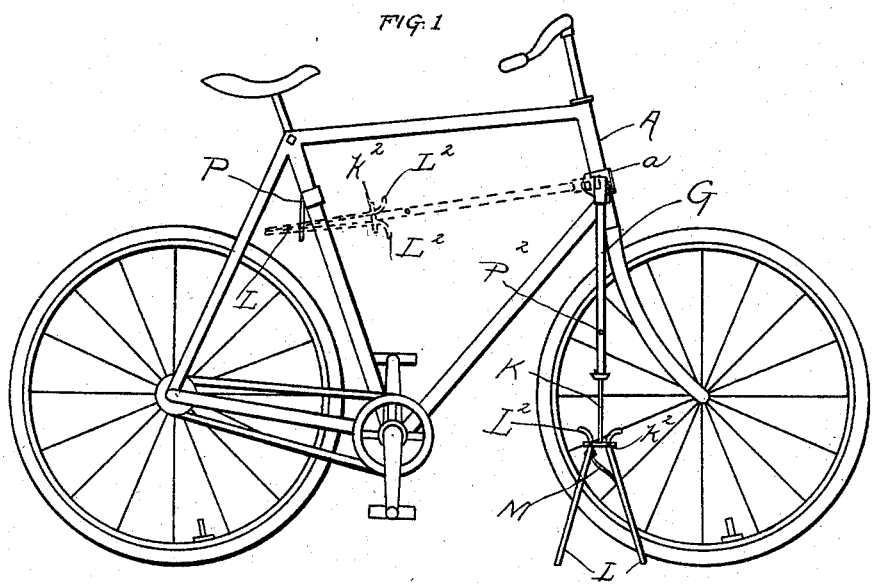
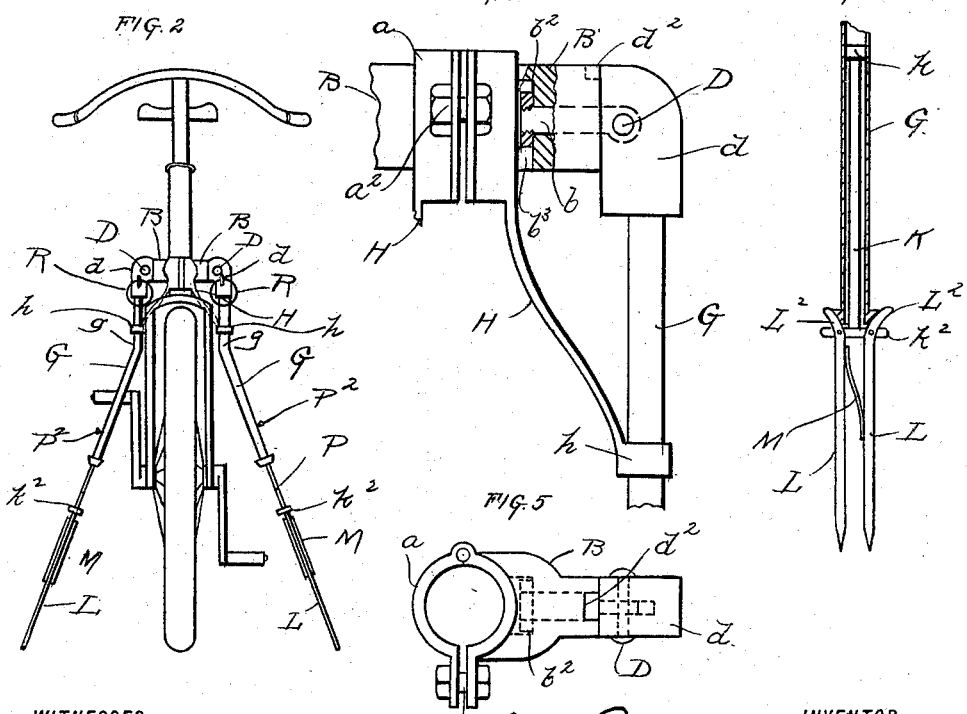
WITNESSES:
C. B. Larson
C. Gerst
INVENTOR
Paul A. Barr
BY
Edgar Tate
ATTORNEYS

UNITED STATES PATENT OFFICE.

PAUL AUGUSTINE BARR, OF PHILADELPHIA, PENNSYLVANIA.

SUPPORT FOR BICYCLES.

SPECIFICATION forming part of Letters Patent No. 589,925, dated September 14, 1897.

Application filed March 17, 1896. Serial No. 583,510. (No model.)

*To all whom it may concern:*

Be it known that I, PAUL AUGUSTINE BARR, a citizen of the United States, and a resident of Philadelphia, in the county of Philadelphia and State of Pennsylvania, have invented certain new and useful Improvements in Supports for Bicycles and Similar Vehicles, of which the following is a specification, reference being had to the accompanying drawings, forming a part thereof, in which similar letters of reference indicate corresponding parts.

This invention relates to bicycles and similar vehicles; and the object thereof is to provide an improved support for this class of vehicles which consists of two separate parts which are adapted to be pivotally connected with a portion of the frame and to be swung downwardly, so as to form braces at each side by which the vehicle may be held in an upright position and which may also be raised into a horizontal position and connected with the frame.

The invention is fully disclosed in the following specification, of which the accompanying drawings form a part, in which—

Figure 1 is a side view of a bicycle provided with my improvement; Fig. 2, an end view thereof. Figs. 3 and 4 represent details of the construction, and Fig. 5 a plan view of one side of my improvement and of the clamp by which it is connected with the frame of the bicycle.

In Fig. 1 of the drawings, forming part of this specification, I have shown an ordinary bicycle and on the forward upright rod A of the frame thereof is mounted a clamp $a$, which consists of two parts which are preferably hinged together at one side and united at the other side by a bolt $a^2$ or any preferred means.

The clamp $a$ is adapted to slide up and down upon the rod A and is provided at opposite sides with shoulders or projections B, which are formed on or secured to the separate sides thereof and in each of which is mounted a bolt $b$, the inner end of which is screw-threaded and provided with a nut $b^2$, which is placed in a chamber or cavity $b^3$, into which it may be inserted either from the top or bottom, and the outer ends of said bolts extend beyond the shoulder or projection B and are provided with a transverse opening through which is passed a bolt D, which is passed through a head $d$, one of which is provided at each side and each of which is connected with a tubular downwardly-directed shaft or rod G, which extends downwardly parallel to a predetermined point $g$, below which they are inclined outwardly, as shown in Fig. 2, and connected with the lower side of the clamp A at each side is an outwardly-curved spring-arm H, which is provided at its lower end with an open spring clamp or band $h$, one of which connects at each side with the corresponding rod or shaft G.

The rods or shafts G are hollow, as hereinbefore described and as shown in Fig. 4, and mounted in the lower end of each is a rod K, the upper end of which is provided with a piston $k$, which fits within said tubular rods or shafts G, and the lower end of which is provided with a cross-head $k^2$, each end of which is provided with a leg L, which is pivotally connected therewith and provided with outwardly-directed upper ends or arms $L^2$, and secured to one of said legs and below the crosshead is a spring M, the opposite end of which bears on the opposite leg, and the object of said spring is to force said legs into the position shown in Figs. 1 and 4.

I also provide a clamping or fastening device P, of any desired form or construction, which is adapted to be connected with one of the rear uprights of the frame and which is adapted to hold my improved bicycle-support in a horizontal position, as shown in dotted lines in Fig. 1, when the bicycle or other vehicle is in use, and the operation of this device will be readily understood from the foregoing description when taken in connection with the accompanying drawings and the following statement thereof.

Each of the heads $d$ is provided on its upper side with a shoulder or projection $d^2$, which is adapted to enter a corresponding notch or recess, one of which is formed on each of the shoulders or projections B, and whenever it is desired to use the device to support a bicycle or other vehicle in a vertical position the rods or shafts G are lowered into the position shown in Figs. 1 and 2, and in this position the legs L, which are connected with each shaft, will bear upon the ground and form a substantially safe support therefor.

The rods K, with which the legs L are connected, are adjustable within the rods or shafts G and may be held at any desired point by the set-screws $P^2$, and the shoulders or projections $d^2$ on the heads serve to retain the shafts or rods G in the position shown in Fig. 2, and the open bands or clamps $h$ on the arms H, which are formed on or secured to the opposite sides of the clamp $a$, also serve for a similar purpose, and the rods or shafts G may be disconnected from the heads or clamps $h$ and swung into the position shown in dotted lines in Fig. 1 whenever it is desired to use the machine, and it will be apparent that the entire support may be disconnected from the frame whenever desired or when it is desired to use the machine without having the support connected therewith, and I also secure to the heads $d$ rings R, to which a chain or chains may be secured for locking the frame and the wheel or wheels together, so as to prevent the use thereof, but these rings and said chain or chains form no part of this invention and may or may not be employed, and said chains are therefore not shown.

This entire device is simple in construction and operation and perfectly adapted to accomplish the result for which it is intended, and it is evident that changes in and modifications of the construction herein described may be made without departing from the spirit of my invention or sacrificing its advantages, and I reserve the right to make all such alterations therein and modifications thereof as fairly come within the scope of the invention.

Having fully described my invention, I claim as new and desire to secure by Letters Patent—

A brace for a bicycle consisting of a clamp in combination with the forward upright, said clamp consisting of two segmentally-formed portions hinged together at one side, shoulders or projections secured on either side of the same and extending outwardly therefrom, each of said shoulders being provided therein with chambers, a bolt in each of said chambers, each of said bolts having screw-threads on the inner ends thereof, a nut secured on the inner end of said bolts and adapted to keep the same in position, said bolts having transversely-extending openings in the outer end of the same a head adapted to pass over the said outer end of said bolt and engage the same, a tubular downwardly-directed shaft secured in each of said heads and extending downwardly to a predetermined point, said shaft extending outwardly below said point, an outwardly-curved arm secured to the lower side of said clamp and engaging a ring or band on the lower end of said arm connected with each of said shafts said rod or shaft being hollow, a rod mounted in the lower end of each of said shafts, a piston on the upper end thereof a cross-head on the lower end of said rods, legs pivotally secured to either end of said cross-head, outwardly-directed upper ends or bars secured to said legs, a spring secured to one of said legs and below said cross-head and engaging said outer legs and a clamping device adapted to be connected with the rear fork of said bicycle and secure the said brace in a horizontal position when not in position, all of the said parts being combined substantially as and for the purpose described.

In testimony that I claim the foregoing as my invention I have signed my name, in presence of the subscribing witnesses, this 13th day of March, 1896.

PAUL AUGUSTINE BARR.

Witnesses:
ROBT. MCCURDY,
JOHN K. BRIGHT.